(12) United States Patent
Petersen et al.

(10) Patent No.: US 11,180,092 B2
(45) Date of Patent: Nov. 23, 2021

(54) VEHICLE BEDLINER

(71) Applicant: NISSAN NORTH AMERICA, INC., Franklin, TN (US)

(72) Inventors: Martin Petersen, Canton, MI (US); John Young, Royal Oaks, MI (US); Neelamkumar Deshpande, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 76 days.

(21) Appl. No.: 16/700,964

(22) Filed: Dec. 2, 2019

(65) Prior Publication Data

US 2021/0162935 A1 Jun. 3, 2021

(51) Int. Cl.
*B60R 13/01* (2006.01)

(52) U.S. Cl.
CPC ............ *B60R 13/011* (2013.01); *B60R 13/01* (2013.01); *B60R 2013/015* (2013.01)

(58) Field of Classification Search
CPC ....... B60R 13/013; B60R 13/01; B60R 13/11; B60R 2013/015; B60R 2013/016
USPC ................................. 296/39.1, 39.2
See application file for complete search history.

(56) References Cited

U.S. PATENT DOCUMENTS

| | | | | |
|---|---|---|---|---|
| 4,279,439 A | * | 7/1981 | Cantieri | B60R 13/01 105/423 |
| 5,882,058 A | * | 3/1999 | Karrer | B60J 7/141 296/39.2 |
| 5,992,915 A | * | 11/1999 | Thompson | B60R 13/01 296/39.2 |
| 8,251,410 B1 | | 8/2012 | Carter et al. | |
| 9,802,534 B1 | * | 10/2017 | Salter | B60Q 3/68 |
| 2004/0041427 A1 | * | 3/2004 | Vitoorapakorn | B60R 13/01 296/39.2 |
| 2016/0347261 A1 | * | 12/2016 | Howell | B62D 25/2072 |

OTHER PUBLICATIONS

Ford F-150, Drop in Bedliner Access Hole Lower Plug Tie Down Covers OEM, 2015-2018 model year, https://picclick.com/2015-2018-Ford-F-150-Drop-In-Bedliner-Access-Hole-322012562093.html.
Chevy Colorado & GMC Canyon Stake Pocket Covers / Bed Rail Caps, Plugs, Sep. 2018, https://www.youtube.com/watch?v=xxjAAsyqduk.
Ford F150, 5.5ft bed, 2015, How to cut out front stake pockets, https://www.youtube.com/watch?v=zUVCt0B0JE8.

* cited by examiner

*Primary Examiner* — Dennis H Pedder
*Assistant Examiner* — Joyce Eileen Hill
(74) *Attorney, Agent, or Firm* — Global IP Counselors, LLP

(57) ABSTRACT

A vehicle bedliner includes a floor panel, a forward panel and a pair of side panels. The floor panel is configured to be disposed on a floor of a cargo box of a truck. The forward panel extends upwardly from the floor panel. Each of the pair of side panels has a main body extending upwardly from the floor panel and extends from a lateral side of the forward panel. First side panel of the pair of side panels includes at least one opening and a severable portion that at least partially overlies the opening.

18 Claims, 7 Drawing Sheets

VEHICLE BEDLINER

BACKGROUND

Field of the Invention

The present invention generally relates to vehicle bedliner. More specifically, the present invention relates to vehicle bedliner.

Background Information

Trucks can be provided with a bedliner to shield the inner-side of a truck bed from damage. Bedliners can also can create a skid-resistant surface allowing cargo to stay in place, depending on circumstances. Bedliners can be "drop-in" that can be easily applied to the truck bed and can be easily removed for cleaning. Bedliners are typically made of a polyethylene composite having a rigid structure formed to the contours of a specific vehicle model.

SUMMARY

In view of the state of the known technology, one aspect of the present disclosure is to provide a vehicle bedliner comprising a floor panel, a forward panel and a pair of side panels. The floor panel is configured to be disposed on a floor of a cargo box of a truck. The forward panel extends upwardly from the floor panel. Each of the pair of side panels has a main body extending upwardly from the floor panel and extends from a lateral side of the forward panel. First side panel of the pair of side panels includes at least one opening and a severable portion that at least partially overlies the opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
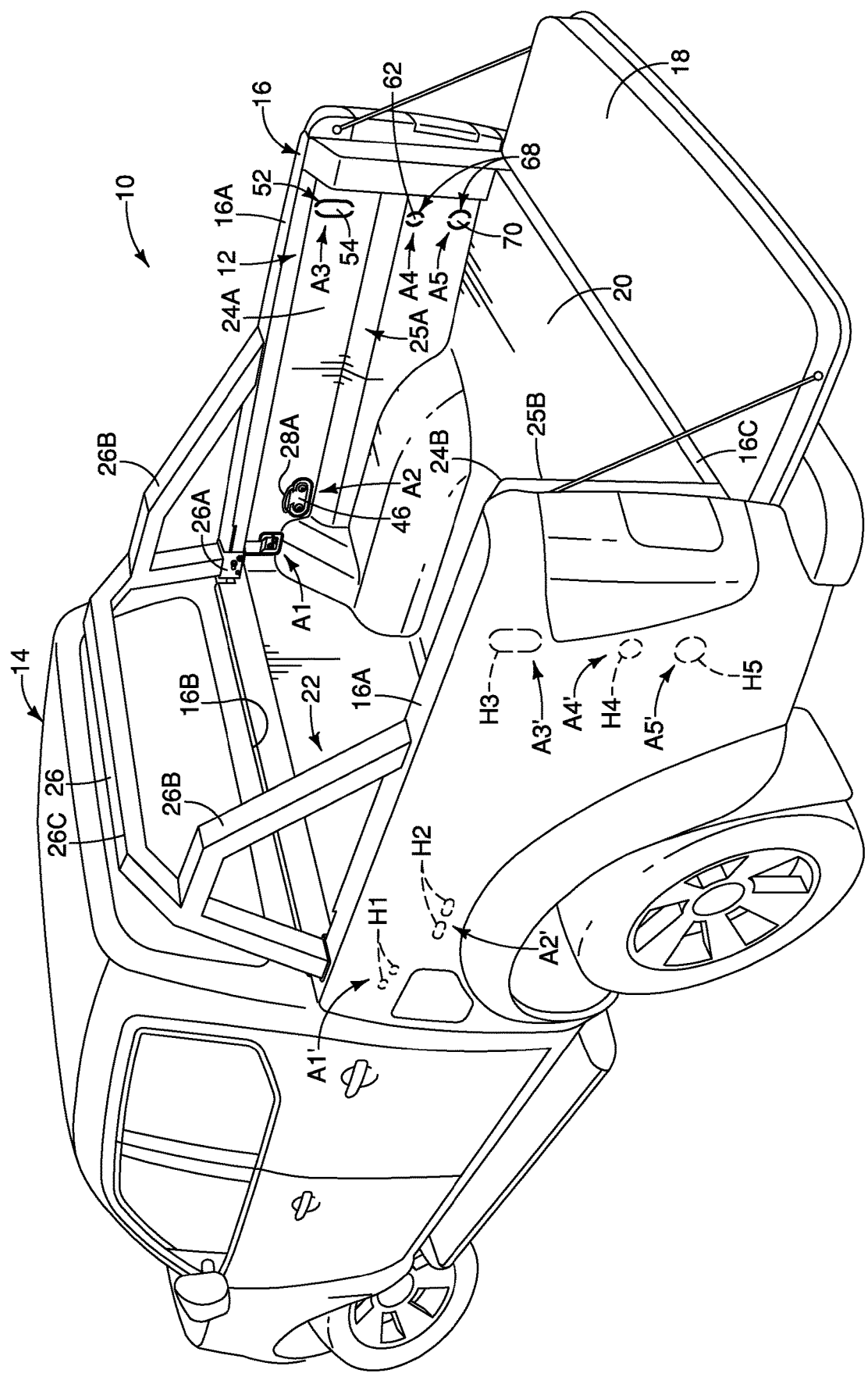
FIG. 1 is a rear perspective view of a vehicle equipped with a bedliner in accordance with an illustrated embodiment.

Referring now to FIG. 1, a vehicle 10 equipped with a bedliner 12 is illustrated in accordance with an embodiment. The vehicle 10 is a pick-up truck which is a light-duty truck having an enclosed cab 14 and a cargo box 16 (or truck bed) sized and configured for cargo storage. The vehicle 10 includes a tailgate 18 that is movable between an open and a closed position to enable access to the cargo box 16. The cargo box 16 is defined by a pair of sidewalls 16A that are made of sheet metal, a front wall 16B defined by the back of the enclosed cab 14, a floor 16C, and the tailgate 18.

The bedliner 12 is use in conjunction with the cargo box 16 of the vehicle 10. In the illustrated embodiment, the bedliner 12 is a one-piece, drop-in bedliner 12 that is sized and dimensioned to substantially correspond to the size and shape of the cargo box 16 so that the bedliner 12 can fit over the cargo box 16. The bedliner 12 is preferably formed of a rigid material, such as a thermoplastic or thermoset material that may be formed integrally molded into a structure that fits the corresponding dimensions of the cargo box 16. Therefore, the bedliner 12 is preferably made of plastics sheets molded according to the inner cargo box 16 surface and mounted on top of the cargo box 16. The bedliner 12 can be lifted and removed as desired. The bedliner 12 can be a one-piece integral member. Alternatively, the bedliner 12 can be made of several panels that are fixed or installed together. The bedliner 12 is secured to the cargo box 16 by conventional means, such as using bolts, rivets or clips for attachment to the cargo box 16.

Figure 3:
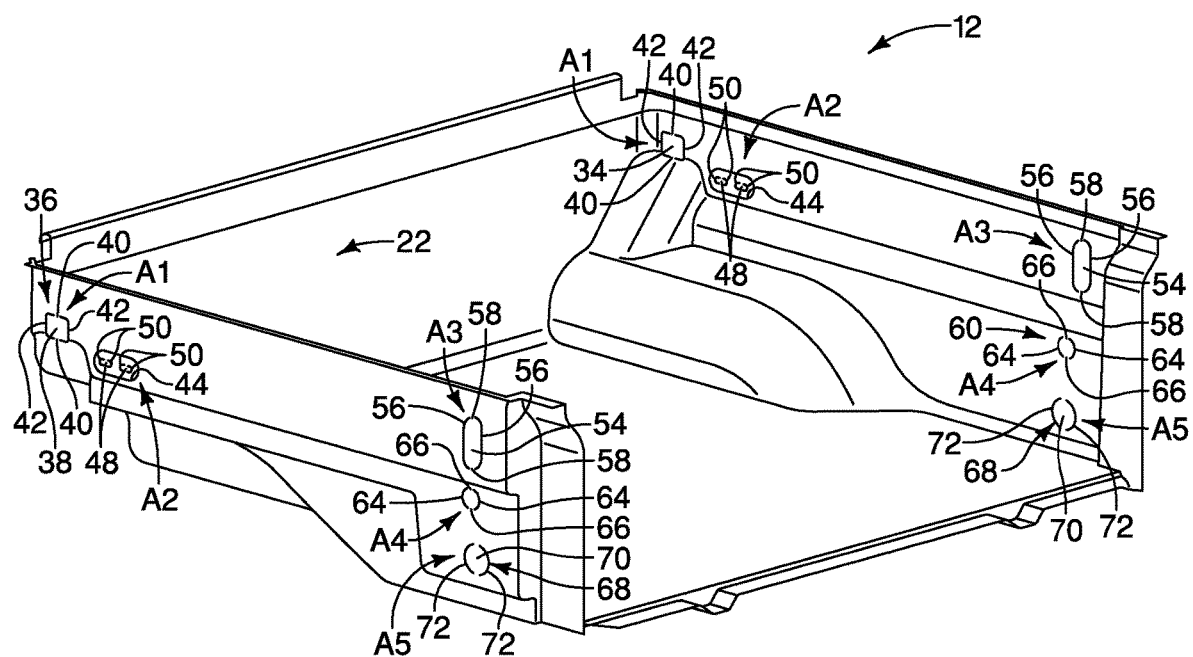
FIG. 3 is a perspective view of the bedliner of FIGS. 1 and 2.

As best seen in FIG. 3, the vehicle bedliner 12 comprises a floor panel 20, a forward panel 22 and a pair of side panels 24A and 24B. The floor panel 20 is configured to be disposed on the floor 16C of the cargo box 16. The forward panel 22 extends upwardly from the floor panel 20. The forward panel 22 extends laterally between the opposing side panels 24A and 24B. The bedliner 12 includes a first side panel 24A and a second side panel 24B that are identical in size and dimension. The first side panel 24A has a first main body 25A and the second side panel 24B has a second main body 25B. The first and second main bodies 25A and 25B extend upwardly from the floor panel 20. The first and second main bodies 25A and 25B each extend from a lateral side of the forward panel 22.

Figure 2:
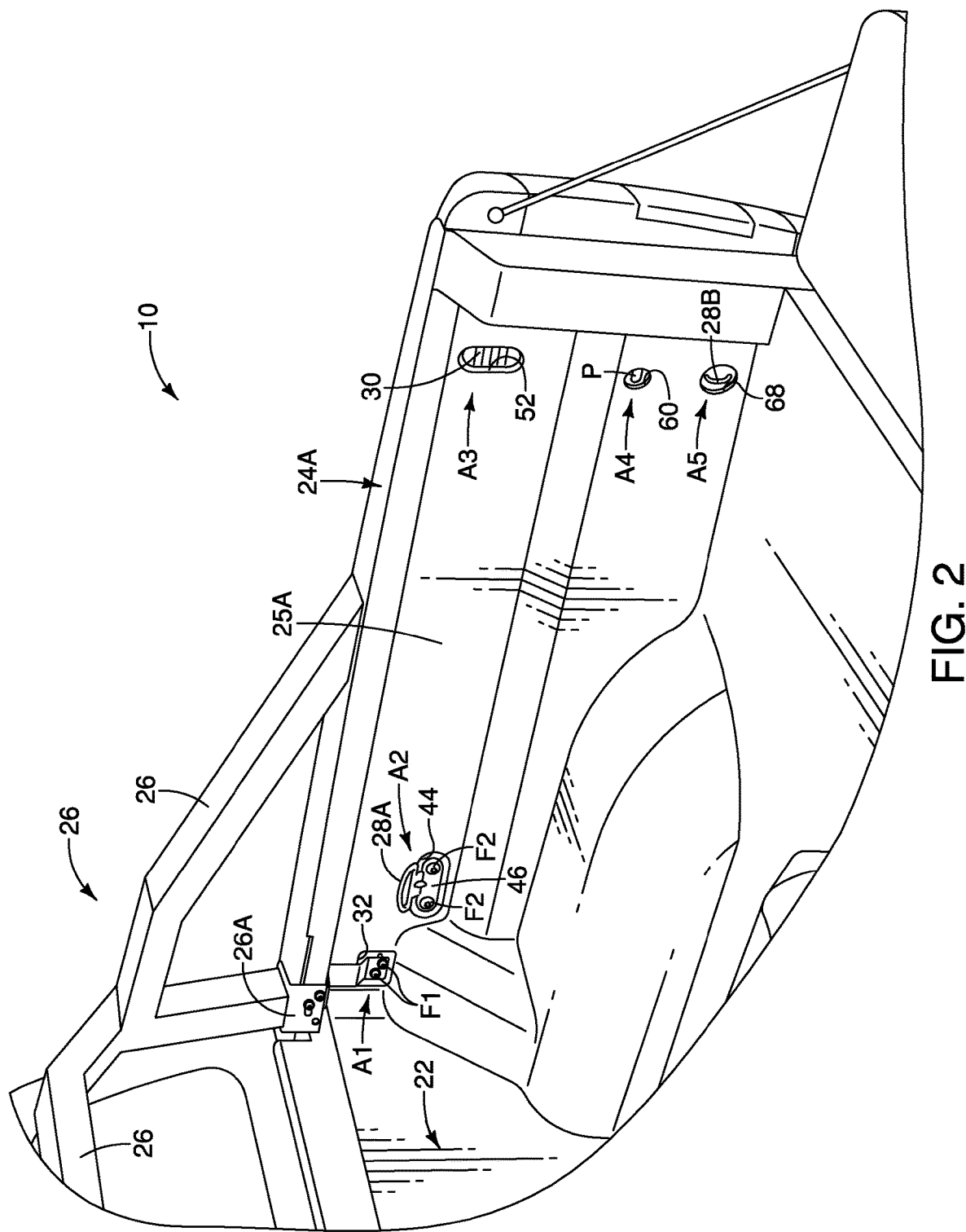
FIG. 2 is an enlarged view of FIG. 1 showing a plurality of accessory installation areas of the vehicle.

In the illustrated embodiment, the vehicle 10 is equipped with one or more accessories that are compatible for use in the cargo box 16. For example, as best seen in FIG. 2, the vehicle 10 is illustrated as being equipped with a sports bar 26 (or roll bar) that is mounted to the cargo box 16 via a sports bar bracket 26A. The sports bar 26 typically can be equipped with lights or illumination assemblies for illuminating the cargo area. Equipment can be secured to the cargo area by being strapped to the sports bar 26. Therefore, the sports bar 26 provides an additional layer of safety and security for the stored objects in the cargo area.

Also, as shown in FIG. 2, the vehicle 10 is further equipped with one or more tie-downs 28A and 28B that also provide additional secure anchor points for attaching straps along the cargo area of the vehicle 10. Tie-downs that can be implemented with the vehicle 10 can be of different types, various sizes and configurations. Examples of tie-downs that can be implemented with the vehicle 10 and the bedliner 12 of the illustrated embodiment include hooks, rails, bull rings, cargo cleats and/or stake pockets. The tie-downs 28A and 28B can receive tie-down straps (also called ratchet straps or lashing straps) to hold down cargo or equipment during transport in the vehicle 10.

Additionally, the vehicle 10 is illustrated as being equipped with a light assembly 30 that is an accessory for illuminating the cargo area of the vehicle 10. For example, the light assembly 30 can be cargo lights that are provided in the form of light strips, motion activated lights, utility lights, LED lights, etc. In the illustrated embodiment, the bedliner 12 can be considered part of a vehicle accessory set. The vehicle accessory set can include the bedliner 12 and any or all of the accessories mentioned herein.

While the vehicle 10 of the illustrated embodiment is disclosed as including the above-mentioned accessories, it will be apparent to those skilled in the vehicle field from this disclosure that the accessories are illustrated as examples only. The vehicle 10 can be equipped with additional or fewer accessories of different types, forms and configurations. For example, the vehicle 10 can also be equipped with rails extending along the lengths of the sidewalls 16A of the cargo box 16 that can serve as tie-downs for equipment dispersed throughout the cargo box 16. The bedliner 12 can be made to accommodate the installation of these rails by having severable sections that can be removed for the rails to be installed onto the cargo box 16. It will also be apparent to those skilled in the vehicle field from this disclosure that the locations of the illustrated accessories are examples only and that the accessories can be implemented at different locations along the vehicle's 10 cargo box 16 as needed and/or desired.

Preferably, the cargo box 16 is configured to include pre-existing installation openings (such as the openings H1-H5) that are each configured to receive an accessory therethrough. The installation openings H1-H5 are usually covered by removable plugs that are plastic (one plug P illustrated as an example in FIG. 2). The plugs are each sized and dimensioned for a snug interference fit into the installation openings H1-H5. During installation, the plugs are removed so that the desired accessory can be installed into the desired installation opening(s) H1-H5.

The bedliner 12 of the illustrated embodiment is made and configured to accommodate one or more accessories, such as the accessories that are illustrated. In particular, as best seen FIGS. 1 to 3, the bedliner 12 includes one or more accessory installation areas A1-A5 that correspond to the pre-existing installation openings H1-H5 in order to receive the appropriate accessory therethrough. In particular, a first, a second, a third, a fourth and a fifth accessory installation area A1, A2, A3, A4 and A5 are illustrated. Each of the accessory installation areas A1-A5 is defined by an opening of the bedliner 12 and a severable portion that at least partially overlies the opening, as will be further described below. In the illustrated embodiment, the bedliner 12 includes a plurality of openings and a plurality of severable portions each partially overlying a corresponding one of the openings. In the illustrated embodiment, the severable portions are connected to the main bodies 25A and 25B by one or more frangible sections, as will be further described below.

While the vehicle 10 of the illustrated is shown as including five accessory installation areas A1-A5 that are disposed on the first side panel 24A, it will be apparent to those skilled in the vehicle field from this disclosure that the bedliner 12 can be altered to include additional or fewer accessory installation areas of varying shapes and sizes at different locations to accommodate different accessories and/or installation openings of the vehicle 10. It will be also apparent to those skilled in the vehicle field from this disclosure that the second side panel 24B of the bedliner 12 can include additional accessory installation areas similar to the first side panel 24A and corresponding to the first side panel 24A as needed and/or desired.

Referring now to FIGS. 1 through 8, a first accessory installation area A1 will be discussed. The first accessory installation area A1 is illustrated as being disposed on the first side panel 24A. The first accessory installation area A1 includes a first opening 32 and a first severable portion 34 that partially overlies the first opening 32. In particular, the first opening 32 is disposed over a first accessory installation opening H1 of the cargo box 16 when the bedliner 12 is disposed on the cargo box 16. The first opening 32 is sized and dimensioned to receive the bracket 26A for the vehicle sports bar 26 therethrough. The first accessory installation opening H1 is a bracket installation opening of the cargo box 16. In other words, in the illustrated embodiment, the first accessory installation area A1 is positioned and configured to accommodate the bracket 26A for the vehicle sports bar 26.

Therefore, as best seen in FIGS. 1 and 2, the first opening 32 is located closer to the forward panel 22 of the bedliner 12 than to the tailgate 18 of the truck when the bedliner 12 is disposed on the cargo box 16. In the illustrated embodiment, the vehicle bedliner 12 further comprises the sports bar bracket 26A. The vehicle bedliner 12 further comprises the sports bar 26 that is mounted to the cargo box 16 by the sports bar bracket 26A. As seen in FIG. 1, the sports bar 26 includes a pair of side bars 26B attached a main bar 26C extending laterally between the two side bars 26B. Each of the side bars 26B are attached to one of the main bodies 25A and 25B of the first and second side panels 24A and 25B of the bedliner 12.

As best seen in FIG. 3, the second side panel 24B includes a second opening 36 that corresponds in size and location to the first opening 32. That is, the second opening 36 is sized and dimensioned to receive another bracket 26A (not shown) for the vehicle sports bar 26. The second opening 36 is aligned with the first opening 32 along the length of the cargo box 16. Thus, the second opening 36 is located closer to the forward panel 22 of the bedliner 12 than to the tailgate 18 of the truck such that the first and second openings 32 and 36 are laterally aligned. The bedliner 12 includes a second severable portion 38 that is identical to the first severable portion 34 and partially overlies the second opening 36. Therefore, the bedliner 12 includes the first and second openings 32 and 36 and the first and second severable portions 34 and 38 that each partially overlie a respective one of the first and second openings 32 and 36. As the first and second openings 32 and 36 are basically identical except that the second opening 36 is disposed on the second side panel 24B, only the first opening 32 will be further discussed for brevity.

Figure 4:
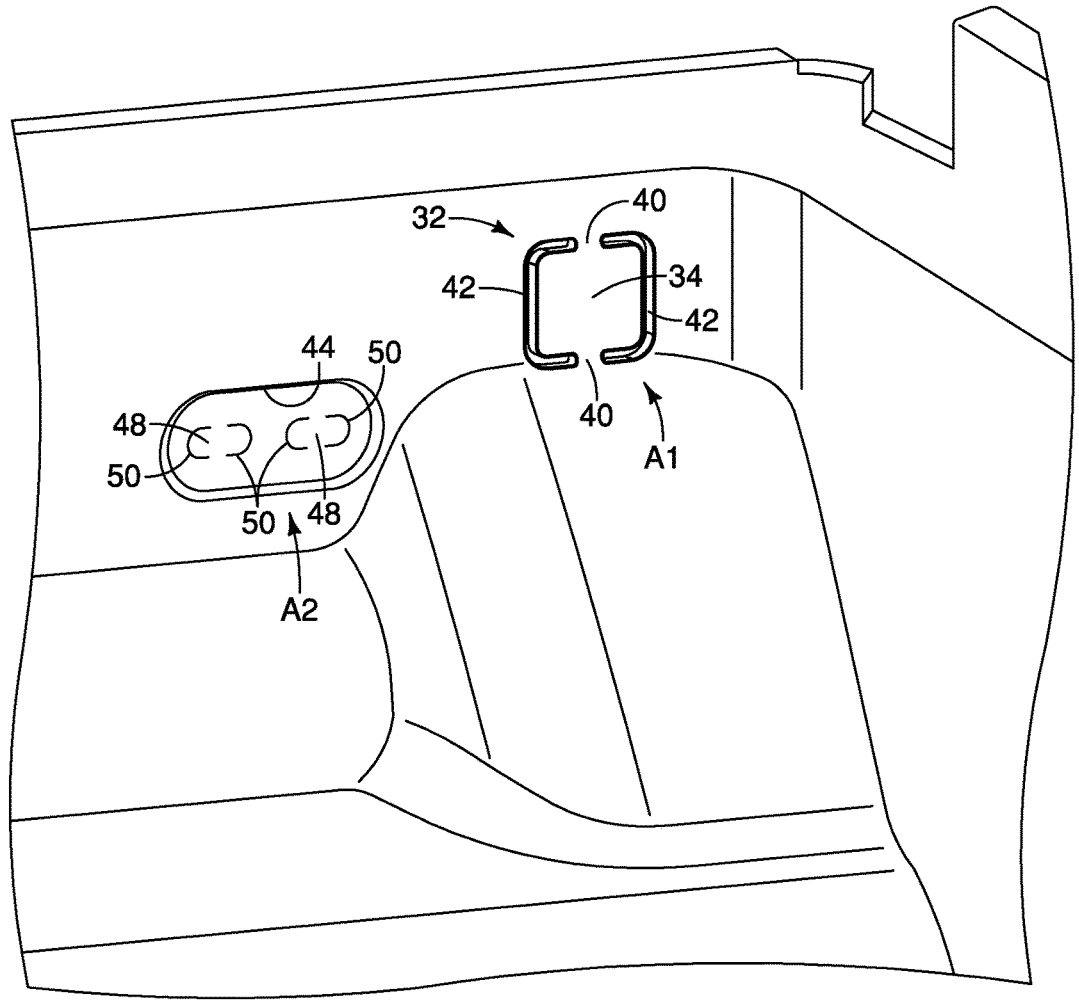
FIG. 4 is an enlarged view of the bedliner showing a first and a second accessory installation area.
Figure 5:
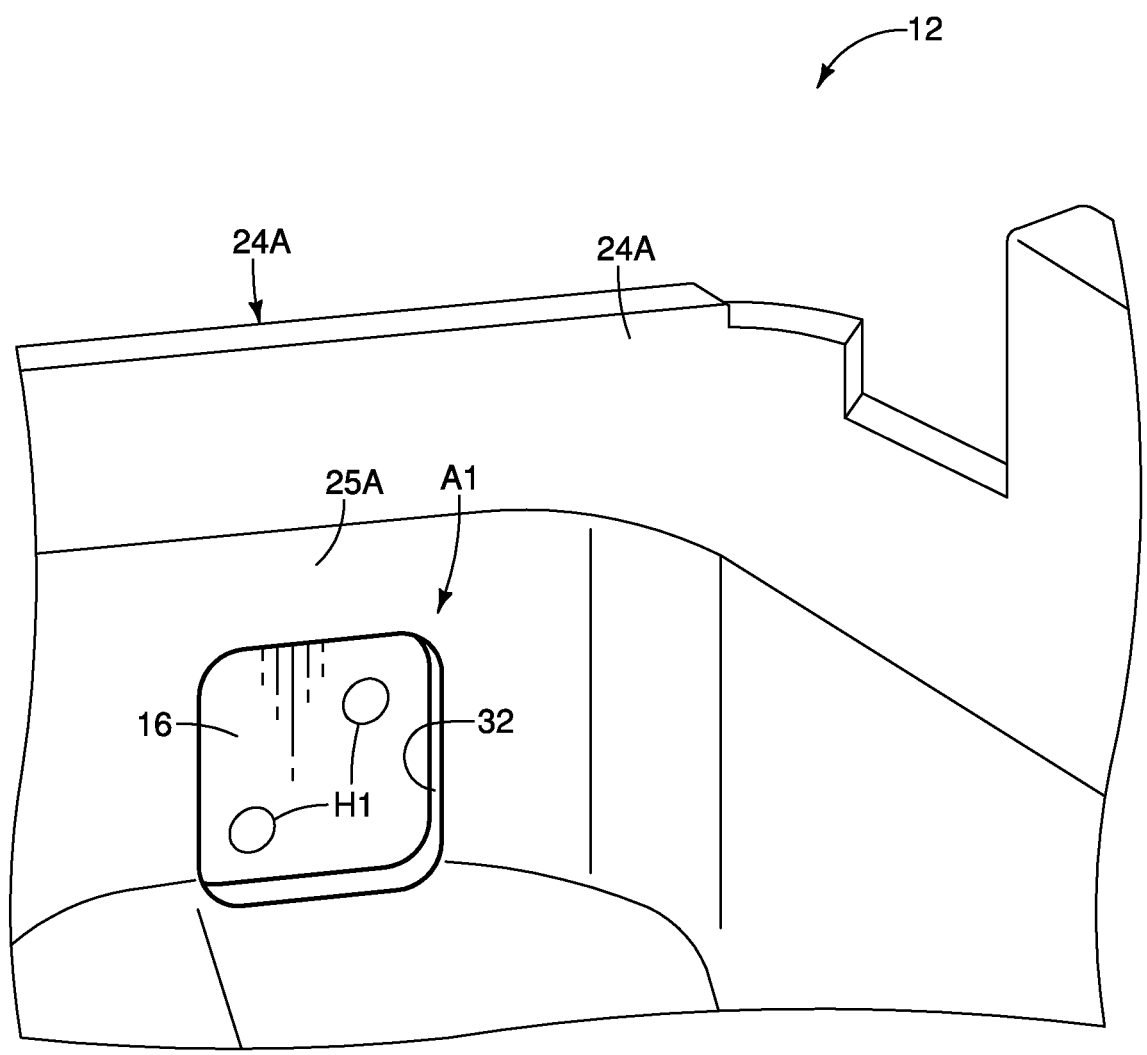
FIG. 5 is an enlarged view of the first accessory installation area with a severable portion removed.
Figure 6:
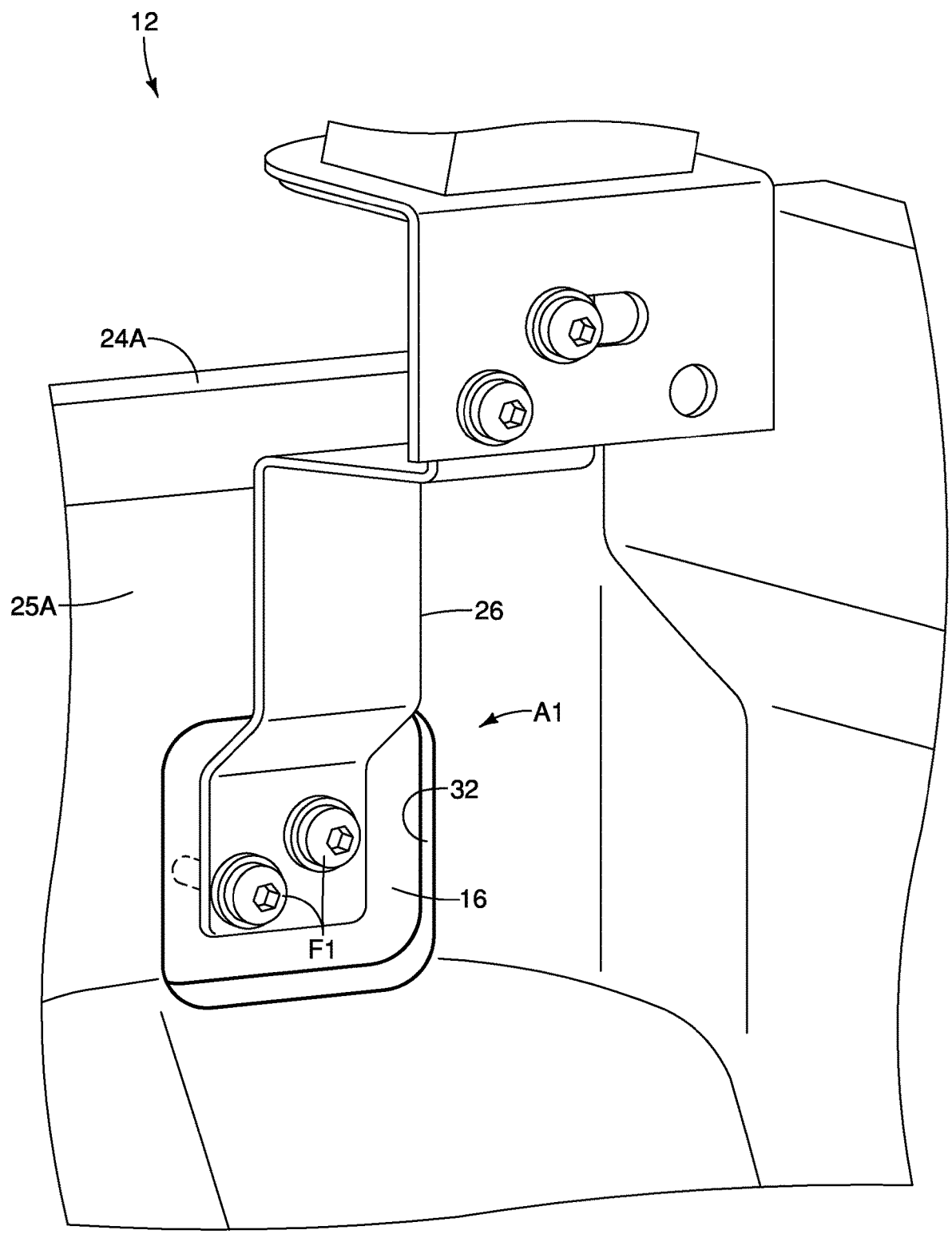
FIG. 6 is an enlarged view of the first accessory installation area with a sports bar bracket installed.
Figure 7:
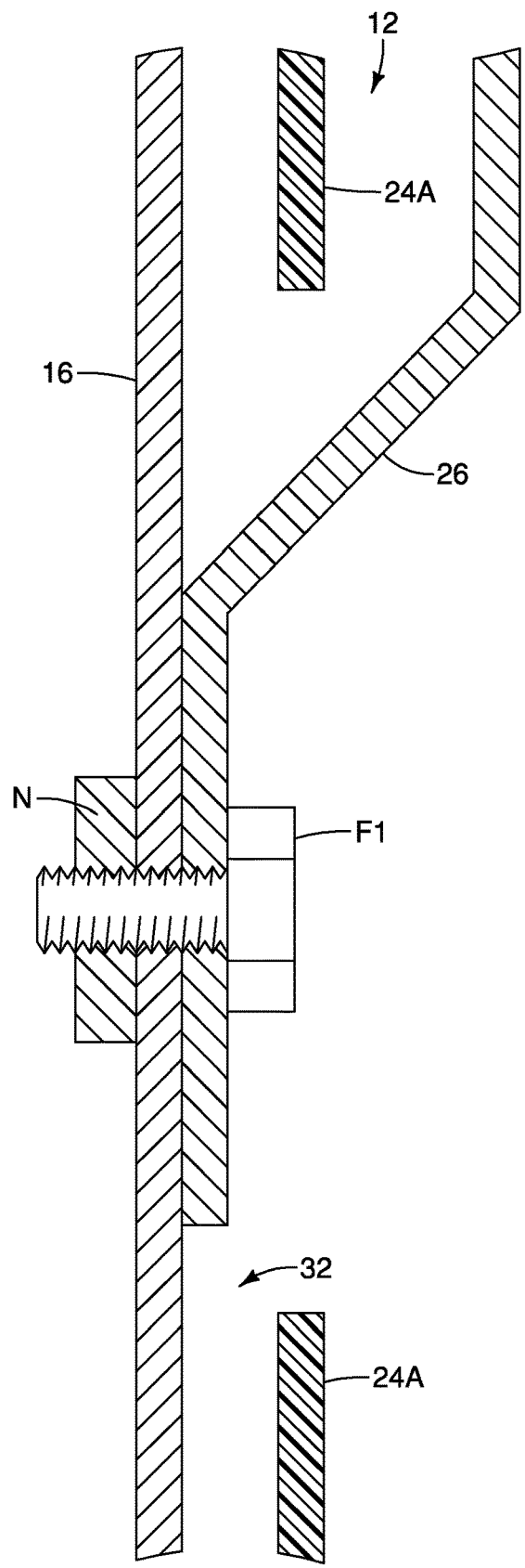
FIG. 7 is a cross-sectional view taken along lines 7-7 of FIG. 6.

Referring to FIGS. 4 and 5, the first severable portion 34 is removed from the first opening 32 by the user so that the bracket 26A can be mounted through the first opening 32 and into the bracket installation opening H1 of the cargo box 16. The bracket installation opening H1 can be considered one of the pre-existing installation openings H1-H5 of the cargo box 16. In particular, the first severable portion 34 is disposed over a pair of bracket installation openings H1 of the cargo box 16, as best seen in FIG. 5. The first severable portion 34 is removed so that the bracket 26A can be installed into the bracket installation openings H1. As best seen in FIG. 7, the bracket installation openings H1 can be bores for receiving fasteners F1 of the bracket 26A, such as screws or a bolts for fastening the bracket 26A to the cargo box 16. Thus, the bracket 26A includes one or more fasteners F1 that are installed into the bracket installation openings H1. The fasteners F1 are received by and secured to the cargo box 16 by well nuts (one well nut N shown in FIG. 5). The first severable portion 34 overlies the bracket installation openings H1 prior to removable. The first severable portion 34 is removed so that the bracket installation openings H1 can be accessed for mounting the bracket 26A to the cargo box 16.

Referring to FIGS. 4 and 5, the first frangible section 40 is broken off to separate the first severable portion 34 from the first opening 32. That is, a user can use pliers, scissors or other appropriate tool to cut away the first frangible section 40 in order to remove the first severable portion 34. The first accessory installation area A1 can include additional first frangible sections 40 that are broken off in a similar manner. The first severable portion 34 is integrally connected to the first main body 25A of the first side panel 24A by a first frangible section 40. That is, the first severable portion 34 is preferably made of the same material as the first main body 25A and is formed by one or more slits 42 such that the first severable portion 34 is a patch or a cover disposed over the bracket installation openings H1. However, it will be apparent to those skilled in the vehicle field from this disclosure that the first severable portion 34 can be made of alternative materials. For example, the bedliner 12 can be provided with a layer of fabric that overlies the first opening 32 and can be torn off of the first opening 32 when necessary.

As shown in FIG. 4, the first accessory installation area A1 includes a pair of slits 42 and a pair of first frangible sections 40 that are separated by the slits 42. Therefore, the first severable portion 34 can be separated from the first main body 25A by one or more slits 42. The ends of the slit 42 are connected by the first frangible sections 40. In this disclosure, the term "slit" can generally be described as an elongated cut or opening. In the illustrated embodiment, the slits 42 are formed by peck drilling or interrupted cut drilling on the first side panel 24A using a computer numerical control (CNC) machine tool. The slits 42 can alternatively be formed using drill techniques with a variety of other semi-automated drilling machines as needed and/or appropriate.

Preferably the slits 42 are sized and dimensioned to enable a tool to be fit into the space of the slit and to cut the first frangible section 40. In the illustrated embodiment, the slits 42 are defined by a 4 to 8 millimeter space. More preferably, the slits 42 are defined by a 6 millimeter space. It will be apparent to those skilled in the vehicle field from this disclosure that the slits 42 can vary with respect to size and dimension to accommodate different tools as needed and/or desired. It will also be apparent to those skilled in the vehicle field from this disclosure that the frangible sections 40 can alternatively be separated by a plurality of drilled openings instead of slits 42 so that the frangible sections can be removed.

The second, third, fourth and fifth accessory installation areas A2-A5 in the illustrated embodiment are similar to the first accessory installation area A1. In particular, the each of the second, third, fourth and fifth accessory installation areas A2-A5 can include a respective severable portion that is connected to the main body by a respective frangible section. In the illustrated embodiment, the severable portions can be considered knockouts that are separated from the respective main bodies 25A and 25B of the first and second side panels 24A and 24B. Therefore, each of the accessory installation areas A1-A5 further includes one or more frangible sections that can be severed during use in order to install the vehicle accessory into the accessory installation areas A1-A5.

Referring to FIGS. 1 to 4, the second accessory installation area A2 will now be further described. The second accessory installation area A2 includes a third opening 44 for receiving another accessory therethrough. Therefore, at least one of the first and second side panels 24A and 24B includes the third opening 44. In the illustrated embodiment, the another accessory is a D-ring tie-down 28A. Therefore, the first side panel 24A includes the third opening 44. In the illustrated embodiment, at least one of the first and second side panels 24A and 24B includes the third opening 44.

The third openings 44 are disposed over a pair of second accessory installation openings H2 of the cargo box 16 when the bedliner 12 is disposed on the cargo box 16, as best seen in FIG. 4. The third openings 44 and the second accessory installation openings H2 receive a pair of fasteners F2 of the D-ring tie-down therethrough to secure the D-ring tie-down 28A to the bedliner 12 and the cargo box 16. In other words, the second accessory installation area A2 includes the third openings 44 for receiving the fasteners F2 of the D-ring tie-down 28A. The third opening 44 is sized and dimensioned to enable access to the second accessory installation openings H2 so that the D-ring tie-down 28A can be installed into the second accessory installation openings H2.

As seen in FIG. 3, the second accessory installation area A2 includes a pair of severable portions 48 that each partially overlie one of the third openings 44. The severable portions 48 can be separated from the first main body 25A by one or more slits 50. The ends of the slit 50 are connected by frangible sections 51, similar to the first accessory installation area A1. The frangible sections 51 are ruptured or cut by a tool via access through the slits 50 in order to remove the severable portions 48 and access the second accessory installation openings H2.

The D-ring tie-down 28A includes has an attachment plate with a pair of openings that correspond to the third openings 44 of the bedliner 12 and to the second accessory installation openings H2 of the cargo box 16. The fasteners F2 extend through the openings of the attachment plate. The D-ring tie-down 28A includes a D-ring or a handle that is fixed to the attachment plate. The D-ring tie-down 28A is designed to help anchor cargo securely in the cargo box 16.

Referring to FIGS. 1 to 3, the third accessory installation area A3 of the bedliner 12 will now be further described. As shown, the first side panel 24A includes a fourth opening 52 that is a light assembly opening for receiving the light assembly 30 therethrough. Therefore, the at least one of the first and second side panels 24A and 24B includes the fourth opening 52. The fourth opening 52 is disposed over a third accessory installation openings H3 of the cargo box 16 when the bedliner 12 is disposed on the cargo box 16. The fourth opening 52 is sized and dimensioned to enable access to the vehicle light assembly 30 that can be installed into the third accessory installation openings H3. For example, the fourth accessory installation area A4 is sized and configured for receive the light assembly 30, such as LED pods.

The third accessory installation area A3 also includes a severable portion 54 that partially overlies the fourth opening 52. The severable portion 54 can be separated from the first main body 25A by one or more slits 56. The ends of the slit 56 are connected by frangible sections 58, similar to the first accessory installation area A1. The frangible sections 58 are ruptured or cut by a tool via access through the slits 56 in order to remove the severable portion 54 and the third accessory installation openings H3.

Referring to FIGS. 1 to 3, the fourth accessory installation area A4 of the bedliner 12 will now be further described. As shown, the first side panel 24A includes a fifth opening 60 that is a tie-down opening for receiving another tie-down (not shown) therethrough. Therefore, the at least one of the first and second side panels 24A and 24B includes the fifth opening 60. The fifth opening 60 is disposed over a fourth accessory installation opening H4 of the cargo box 16 when the bedliner 12 is disposed on the cargo box 16. The fifth opening 60 is sized and dimensioned to enable access to the tie-down (not shown) that can be installed into the fourth accessory installation opening H4.

As shown, a plug P is disposed through the fourth accessory installation opening H4. The plug P can be a plastic plug that is provided with the vehicle 10 to protect the fourth accessory installation opening H4. When the user is ready to install an accessory to the fourth accessory installation area A4, the plug P is removed. The fourth accessory installation area A4 also includes a severable portion 62 that partially overlies the fifth opening 60. The severable portion 62 can be separated from the first main body 25A by one or more slits 64. The ends of the slit 64 are connected by frangible sections 66, similar to the first accessory installation area A1. The frangible sections 66 are ruptured or cut by a tool via access through the slits 64 in order to remove the severable portion 62 and the fourth accessory installation openings H4.

Referring to FIGS. 1 to 3, the fifth accessory installation area A5 of the bedliner 12 will now be further described. As shown, the first side panel 24A includes a sixth opening 68 that is a tie-down opening for receiving another tie-down therethrough. Therefore, the at least one of the first and second side panels 24A and 24B includes a sixth opening 68. The sixth opening 68 is disposed over a fifth accessory installation opening H5 of the cargo box 16 when the bedliner 12 is disposed on the cargo box 16. The fifth opening 60 is sized and dimensioned to enable access to the tie-down that can be installed into the fifth accessory installation opening H5.

As shown, the sixth opening 68 receives the tie-down that is a bull-ring tie-down 28B. The bull-ring tie-down 28B is fixedly disposed through the fifth accessory installation opening H5 in a conventional manner. The bull-ring tie-down 28B includes a bull-ring disposed on an attachment plate that is fixed through the fifth accessory installation opening H5. The fifth accessory installation area A5 also includes a severable portion 70 that is partially overlies the sixth opening 68. The severable portion 70 can be separated from the first main body 25A by one or more slits 72. The ends of the slit 72 are connected by frangible sections 73, similar to the first accessory installation area A1. The frangible sections 73 are ruptured or cut by a tool via access through the slits 72 in order to remove the severable portion 70 and the fifth accessory installation openings H5.

In the illustrated embodiment, while the description of the accessory installation areas A1-A5 have been described as being provided on the first sidewall 16A of the cargo box 16 and the first side panel 24A of the bedliner 12, it will be apparent to those skilled in the vehicle field from this disclosure that the vehicle 10 can include corresponding accessory installation areas A1'-A5' as provided on the second sidewall 16A of the cargo box 16 and the second side panel 24B of the bedliner 12. For example, corresponding accessory installation areas A1'-A5' that are provided on the second sidewall 16A of the cargo box 16 are illustrated on FIG. 1. The corresponding accessory installation areas A1'-A5' are identical to the accessory installation areas A1-A5 that have been described above. However, it will be apparent to those skilled in the vehicle field from this disclosure that the corresponding accessory installation areas A1'-A5' can vary with respect to size, shape and dimension to accommodate different accessories as needed and/or desired.

Figure 8:
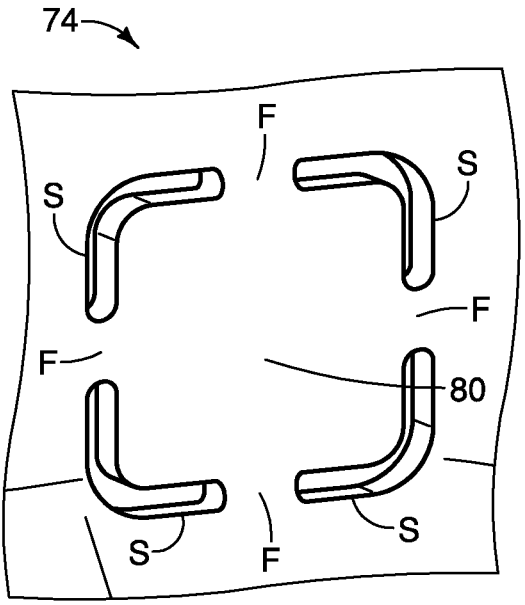
FIG. 8 is a first modified accessory installation area that can be implemented with the vehicle.
Figure 9:
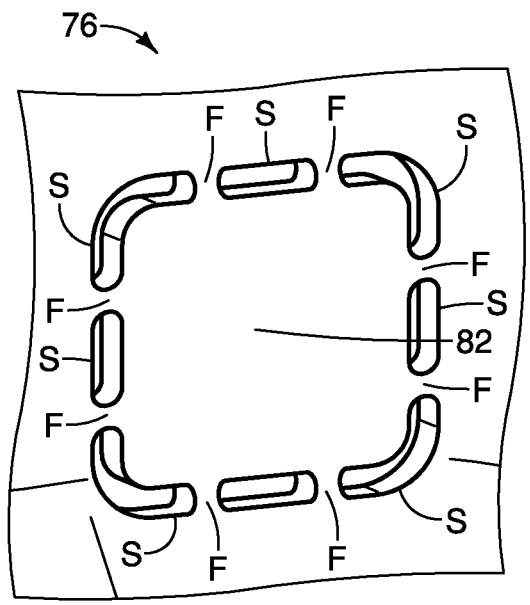
FIG. 9 is a second modified accessory installation area that can be implemented with the vehicle.
Figure 10:
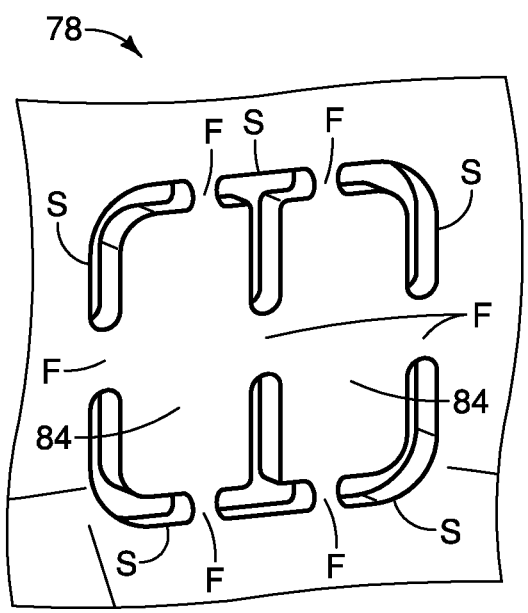
FIG. 10 is a third modified accessory installation area that can be implemented with the vehicle.

Referring to FIGS. 8 to 10, a plurality of modified openings 74, 76, 78 are illustrated. The modified openings 74, 76, 78 can be implemented with the bedliner 12. Each of the modified openings 74, 76, 78 include modified severable portions 80, 82, 84 that are connected to one or more of the main bodies 25A and 25B of the bedliner 12. The modified openings 74, 76, 78 are basically identical to the openings 32, 44, 52, 60 and 68 of FIGS. 1 to 3, except that the modified openings 74, 76, 78 include additional slits S and additional frangible portions F for defining the severable portions 80, 82 and 84. For example, as seen in FIG. 10, the first side panel 24A can a pair of openings 78 disposed side by side and a pair of severable portions 84, each one of the severable portions 84 at least partially overlies one of the pair of openings 78. Due to the similarity between the modified openings 74, 76, 78 and the openings 32, 44, 52, 60 and 68, the modified openings 74, 76, 78 will not be further discussed herein. It will be apparent to those skilled in the vehicle field from this disclosure that the types numbers of slits S and frangible portions F are not limited to those disclosed herein.

General Interpretation of Terms

In understanding the scope of the present invention, the term "comprising" and its derivatives, as used herein, are intended to be open ended terms that specify the presence of the stated features and elements, but do not exclude the presence of other unstated features and elements. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle bedliner. Accordingly, these terms, as utilized to describe the present invention should be interpreted relative to a vehicle equipped with the vehicle bedliner.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle bedliner comprising:
a floor panel configured to be disposed on a floor of a cargo box of a truck to define a cargo area of the truck;
a forward panel extending upwardly from the floor panel; and
a pair of side panels, each of the pair of side panels having a main body extending upwardly from the floor panel and extending from a lateral side of the forward panel towards a truck rearward direction, a first side panel of the pair of side panels including
a first opening that is located adjacent to the forward panel of the bedliner, the first opening being disposed over a first accessory receiving hole of the cargo box when the bedliner is disposed on the cargo box, the first accessory opening being a pre-existing opening of the cargo box, and
a severable portion that at least partially overlies the first opening to cover the first accessory receiving hole, the severable portion being removable to expose the first accessory receiving hole with the first opening facing towards the cargo area of the truck.

2. The vehicle bedliner according to claim 1, wherein the severable portion is integrally connected to the main body of the first side panel by at least one frangible section.

3. The vehicle bedliner according to claim 2, wherein the severable portion is a knockout that is to be removed from the main body of the first side panel at the at least one frangible section.

4. The vehicle bedliner according to claim 2, wherein the severable portion is separated from the main body of the first side panel by one or more slits.

5. The vehicle bedliner according to claim 1, wherein the first opening being located closer to the forward panel of the bedliner than to a tailgate of the truck when the bedliner is disposed on the cargo box.

6. The vehicle bedliner according to claim 5, wherein the first opening is sized and dimensioned to receive a bracket for a vehicle sports bar.

7. The vehicle bedliner according to claim 6, wherein a second side panel of the pair of side panels includes a second opening of the at least one opening, the second opening being located closer to the forward panel of the bedliner than to the tailgate of the truck such that the first and second openings are laterally aligned.

8. The vehicle bedliner according to claim 7, wherein at least one of the first and second side panels includes a third opening of the at least one opening, the third opening being disposed over a second accessory receiving hole of the cargo box when the bedliner is disposed on the cargo box.

9. The vehicle bedliner according to claim 8, wherein the third opening is sized and dimensioned to enable access to a tie down that can be installed into the second accessory receiving hole.

10. The vehicle bedliner according to claim 7, wherein at least one of the first and second side panels includes a fourth opening of the at least one opening, the fourth opening being disposed over a third accessory receiving hole of the cargo box when the bedliner is disposed on the cargo box.

11. The vehicle bedliner according to claim 10, wherein the fourth opening is sized and dimensioned to enable access to a vehicle light assembly that can be installed into the third accessory receiving hole.

12. The vehicle bedliner according to claim 4, wherein the at least one severable portion is separated from the main body of the first side panel by one slit of the one or more slits, the ends of the slit being connected by the frangible section.

13. The vehicle bedliner according to claim 4, wherein the one or more slits includes a pair of slits and a pair of frangible sections that are separated by the slits.

14. The vehicle bedliner according to claim 1, wherein the first side panel includes a pair of openings disposed side by side and a pair of severable portions, each one of the severable portions at least partially overlies one of the pair of openings.

15. The vehicle bedliner according to claim 6, wherein the bedliner is part of a vehicle accessory set, the vehicle accessory set further comprising the sports bar bracket.

16. The vehicle bedliner according to claim 15, wherein the vehicle accessory set further comprises a sports bar that is mounted to the cargo box by the sports bar bracket.

17. The vehicle bedliner according to claim 1, wherein the second side panel of the pair of side panels includes
a first corresponding opening that is disposed over a first corresponding accessory receiving hole of the cargo box, and
a first corresponding severable portion that at least partially overlies the first corresponding opening, the first corresponding severable portion being removable to expose the first corresponding accessory receiving hole with the first opening and the first corresponding opening facing each other.

18. A vehicle comprising:
a cargo box having a plurality of accessory receiving holes that are pre-existing installation openings for attaching vehicle accessories to the cargo box; and
a vehicle bedliner being configured to be disposed in the cargo box, the bedliner having a plurality of openings and a plurality of severable portions, each of the severable portions at least partially overlying one of the openings, each of the severable portions being removable from the openings to expose the accessory receiving holes of the cargo box.

* * * * *